R. O. HENDRICKSON.
TRACTION ENGINE.
APPLICATION FILED JAN. 25, 1911.

1,209,706.

Patented Dec. 26, 1916.

Witnesses:
Blanche Hartman
J. J. Schwartz

Inventor
Robert O. Hendrickson
by W. L. Lord
Attorney

UNITED STATES PATENT OFFICE.

ROBERT OSCAR HENDRICKSON, OF PORTLAND, OREGON, ASSIGNOR, BY MESNE ASSIGNMENTS, TO WALLIS TRACTOR COMPANY, OF RACINE, WISCONSIN, A CORPORATION OF WISCONSIN.

TRACTION-ENGINE.

1,209,706.

Specification of Letters Patent.

Patented Dec. 26, 1916.

Application filed January 25, 1911. Serial No. 604,539.

*To all whom it may concern:*

Be it known that I, ROBERT O. HENDRICKSON, a citizen of the United States, residing at Portland, in the county of Multnomah and State of Oregon, have invented new and useful Improvements in Traction-Engines, of which the following is a specification.

This invention relates to traction engines, and consists in certain improvements in the construction thereof as will be hereinafter fully described and pointed out in the claims.

In carrying out my invention I utilize the exhaust from a fluid actuated motor, preferably an internal combustion motor for cleaning and lubricating the drive connection driven by the engine. Ordinarily in a traction engine there is a gear secured to the traction wheels. This gear is driven by a smaller gear or pinion driven by the engine. The gear on the traction wheels is of a size and so arranged that it is difficult to properly house this gear to exclude the dirt, and as these engines are used in many places where they are subjected to severe conditions in this respect, it is very desirable to have some arrangement for keeping the gears free from such dirt or dust, and at the same time for properly lubricating the gears.

In my invention, I lead the exhaust from the motor to a point adjacent to the gears and direct the exhaust fluids against the gears preferably as they approach each other so that at the moment of engagement, or coming into mesh, all the dirt has been blown off the gears through the action of the exhaust, and at the same time, the waste oil carried by the exhaust is deposited in sufficient quantities on the gears to properly lubricate them.

Figure 1:
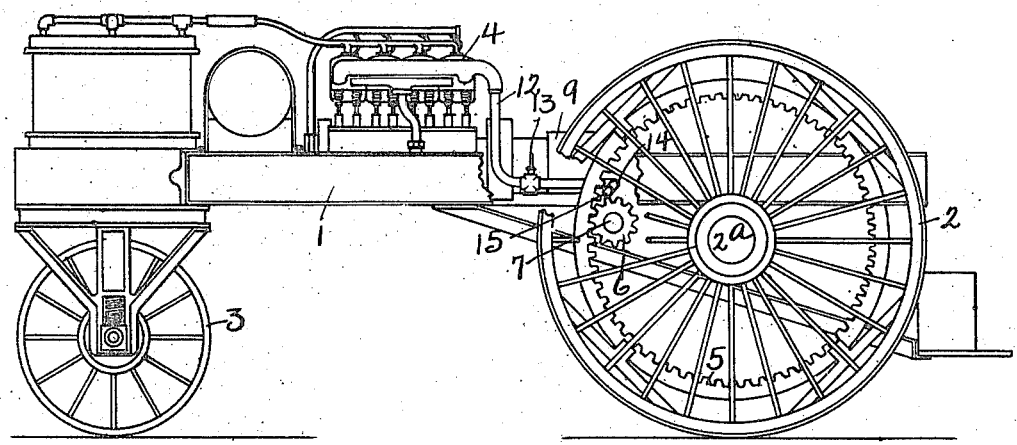
Figure 2:
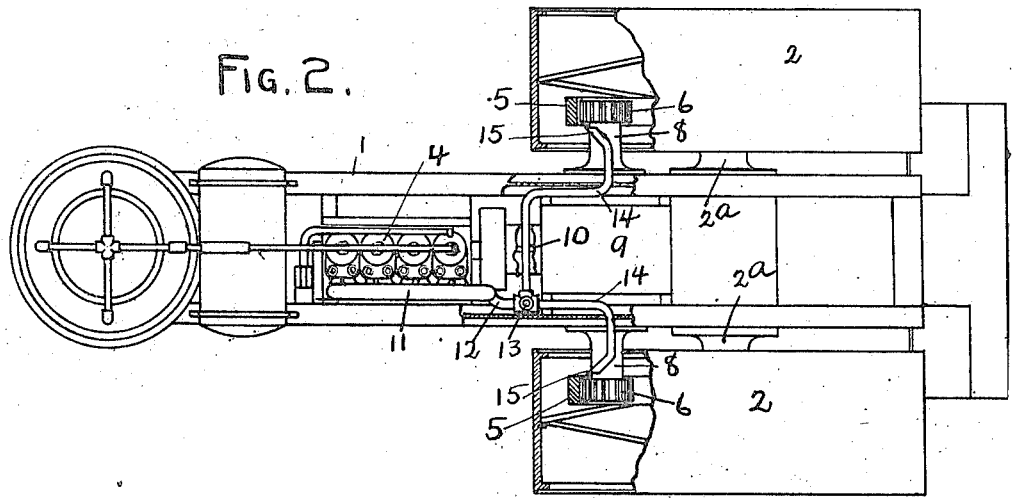

The invention is illustrated in the accompanying drawings as follows:

Figure 1, shows a side elevation of a traction engine, a part of the frame being broken away to better show construction. Fig. 2, shows a plan view of a traction engine, a part being broken away to better show construction.

1 marks the frame of the traction engine, 2 the traction wheel, 3 the steering wheel, 4 the engine mounted on the frame. The traction wheels are mounted on the axles $2^a$ in any desired manner. The internal gears 5 are arranged on the traction wheels. The spur gears 6 mesh these internal gears 5. The gears 6 are fixed on the shafts 7. The shafts 7 are driven through the speed changing and differential mechanism 9 from the engine shaft 10. I have shown only the case outline of the differential and speed changing mechanism, but it will be understood that any of the ordinary devices for this purpose may be used.

The motor shown is of the internal combustion type, and the exhaust fluids from the motor are gathered up in the manifold 11, and carried to the exhaust pipe 12. This leads to a cutout valve 13. Branch pipes 14 lead from the cutout valve terminating in the ends 15 which are adjacent to and directed against the gears at a point where they are approaching engagement. The cutout valve operates in the usual manner, and by its use the branch pipes may be cut out and the exhaust made direct. Normally, however, the pipes 14 are in communication with the pipe 12.

It will be observed that any dirt or other material that may be deposited on the gears is blown off by the exhaust, and at the same time any lubricating matter there may be in the fluid is deposited on the gears so that they are in this manner lubricated.

What I claim as new is:

1. In a traction engine the drive of which includes a pair of intermeshing gears and which is driven by a fluid actuated motor, a pipe connected to the exhaust of the motor at one end and the other end of which is open and directed against the engaging surfaces of the gears, substantially as described.

2. In a traction engine, the driving mechanism of which comprises intermeshing gear wheels and which is driven by a fluid actuated motor, a connection from the exhaust of said motor arranged to direct the exhaust from the motor into the bite of said intermeshing gears, substantially as described.

3. In a traction engine, circular racks upon the traction wheels thereof, pinions engaging such racks, the racks and pinions being fully exposed, an internal combustion engine for driving the traction engine and a connection leading from the exhaust of said traction engine adapted to direct the products of combustion into the bite of the rack and gear.

In testimony whereof I have hereunto set my hand in the presence of two subscribing witnesses.

ROBERT OSCAR HENDRICKSON.

Witnesses:
H. V. CARPENTER,
ELIJAH CORBETT.